(12) United States Patent
Schmidt et al.

(10) Patent No.: US 12,216,780 B2
(45) Date of Patent: Feb. 4, 2025

(54) MANAGING PURPOSE-BASED PROCESSING OF DATA USING A PURPOSE AGENT

(71) Applicant: SAP SE, Walldorf (DE)

(72) Inventors: Diane Schmidt, Walldorf (DE); Carsten Pluder, Spiesen-Elversberg (DE)

(73) Assignee: SAP SE, Walldorf (DE)

( * ) Notice: Subject to any disclaimer, the term of this patent is extended or adjusted under 35 U.S.C. 154(b) by 428 days.

(21) Appl. No.: 17/546,351

(22) Filed: Dec. 9, 2021

(65) Prior Publication Data

US 2023/0185938 A1 Jun. 15, 2023

(51) Int. Cl.
*G06F 21/62* (2013.01)

(52) U.S. Cl.
CPC .................. *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 8,527,468 B1* | 9/2013 | Crafford | G06F 16/93 707/662 |
| 2013/0238563 A1* | 9/2013 | Amarendran | G06F 16/21 707/654 |
| 2014/0032600 A1* | 1/2014 | Sarferaz | G06F 16/00 707/E17.005 |
| 2015/0248419 A1* | 9/2015 | Motoyoama | G06F 16/125 726/1 |
| 2018/0052874 A1* | 2/2018 | Huang | G06F 16/22 |
| 2022/0382713 A1* | 12/2022 | Sadiq | G06F 16/27 |
| 2023/0112332 A1* | 4/2023 | Brenner | G06F 3/0643 707/827 |
| 2023/0133938 A1* | 5/2023 | Knotts | G06F 16/2379 719/328 |
| 2023/0385449 A1 | 11/2023 | Pluder et al. | |

* cited by examiner

*Primary Examiner* — David J Pearson
(74) *Attorney, Agent, or Firm* — Klarquist Sparkman, LLP (57) ABSTRACT

Computer-readable media, methods, and systems are disclosed for providing purpose-based processing of data. A purpose agent assigns one or more purposes to a set of data such that access to the set of data may be restricted to a select few specifically authorized entities based on an assigned purpose. A retention period for storing the data is determined based on the assigned purpose. When the retention period expires the data is deleted from a data store.

20 Claims, 4 Drawing Sheets

MANAGING PURPOSE-BASED PROCESSING OF DATA USING A PURPOSE AGENT

BACKGROUND

Typical data storage and processing techniques fail to store data in a manner in which access may be restricted granularly based on a purpose for processing the data. Further, in some cases, legal requirements and personal preferences are established which define storage periods for which personal data should be stored. Accordingly, because current data storage techniques do not provide any means to store data and manage access based on purpose, they do not accommodate the established legal requirements and personal preferences. Additionally, the data storage techniques fail to provide any way for data subjects to review access to their personal data based on the purpose for which the personal data is being processed.

SUMMARY

Embodiments solve the above-mentioned problems by providing systems, methods, and computer-readable media for providing purpose-based processing and storage of data. Purposes are assigned by a purpose agent based on specific preferences and data requirements, as well as the data content.

Some embodiments are directed to computer-readable media, methods, and systems for providing purpose-based processing within a data system, the method comprising receiving a set of data within an application, the set of data comprising personal data of a data subject, responsive to receiving the set of data, initiating an asynchronous trigger event within a purpose agent, assigning, using the purpose agent, a primary purpose to the set of data based on one or more predetermined purpose determination rules, determining a retention period for the set of data based on the assigned primary purpose, storing the set of data in a data store, restricting access to the set of data based on the assigned primary purpose, and after the retention period has expired, deleting the set of data from the data store.

Additional embodiments are directed to providing purpose-based processing and data storage wherein data of a data subject is assigned a purpose to restrict access and processing of the data for a data controller and other entities.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments are described in detail below with reference to the attached drawing figures, wherein.

The drawing figures do not limit the disclosure to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the disclosure in sufficient detail to enable those skilled in the art to practice the present teachings. Other embodiments can be utilized, and changes can be made without departing from the scope of the disclosure. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Figure 1:
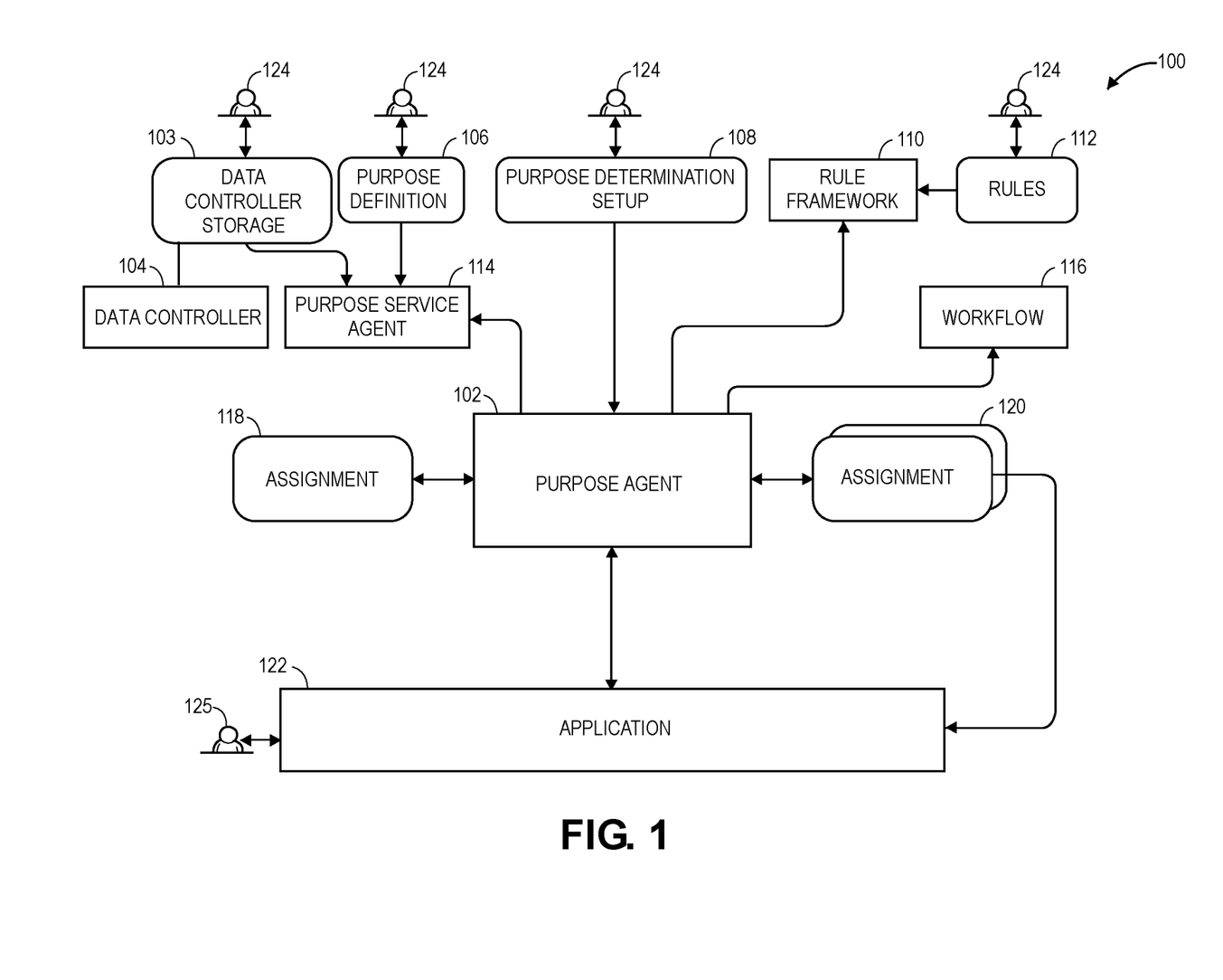
FIG. 1 depicts an exemplary system diagram for purpose-based processing relating to some embodiments.

Turning first to FIG. 1, an exemplary system diagram is depicted relating to some embodiments and is referred to generally by reference numeral 100. In some embodiments, a purpose agent 102 is included for assigning a purpose to a set of data belonging to a data subject. In some embodiments, a data controller storage 103 may be included for storing data associated with a data controller 104. In some embodiments, the data controller 104 is an organization or other entity which collects data from a data subject. Embodiments are contemplated in which the data controller 104 may be associated with a processor that processes data from the data subject. Further, in some embodiments, the data controller 104 may be associated with, for example, a cloud-based service provider. Accordingly, in some embodiments, the data controller 104 may manage access to data of the data subject across a cloud-based service platform.

In some embodiments, a purpose definition 106 may be included which may include one or more definitions defining one or more respective purposes. Further, a purpose determination setup agent 108 may be included for managing purpose determination of the purpose agent 102. Further still, a rule framework agent 110 may be included for managing a rule framework associated with the purpose agent 102. Here, the rule framework agent 110 may include a plurality of rule definitions corresponding to one or more rules 112. In some embodiments, a variety of different purposes are contemplated including purposes relating to legal parameters or requirements and purposes related to consent of the data subject. Further, in some embodiments, additional user-defined purposes may be included.

In some embodiments, a purpose service agent 114 may be communicatively coupled to the data controller storage 103 and the purpose definition 106 such that the purpose service agent 114 is able to access and retrieve the data controller storage 103 and the purpose definition 106. Further, the purpose service agent 114 may interface with the purpose agent 102 to manage one or more purpose service requests. Additionally, a workflow 116 may be associated with the purpose agent 102. In some embodiments, the purpose agent 102 uses the workflow 116 to identify a document such that the purpose agent 102 can assign a purpose to the document. In some embodiments, the purpose agent 102 provides an assignment 118 to a newly identified purpose assigned to a set of master data. In some embodiments, the assignment includes a purpose assigned to a set of data. Further, in some embodiments, the purpose agent 102 provides one or more other assignments 120 related to subsequent sets of data. In some embodiments, the identified purpose assignments for the newly identified document may be stored.

In some embodiments, the purpose agent 102 is communicatively coupled to an application 122. In some embodiments, the application 122 is an application running on a user device in which the purposes of the purpose agent are implemented. In some embodiments, the assignments 120 may be provided to the application 122, as shown. Embodiments are contemplated in which the workflow 116 is executed at least partially within the application 122. Additionally, in some embodiments, one or more users 124 may interact with various components of the system 100, as shown. For example, a first user may operate the data controller storage 103 or data controller 104, a second user may provide the purpose definition 106, a third user may operate the purpose determination setup agent 108, and a fourth user may provide the rules 112. Alternatively, in some embodiments, single user may interact with a combination of the components. For example, a first user may operate both the data controller 104 and the purpose determination setup agent 108. Further still, in some embodiments, a user may interact with the application 122, for example, using a user device on which the application 122 is running.

In some embodiments, various components of the system 100 may be active while other components may be used for storage. For example, embodiments are contemplated in which the purpose agent 102, the rule framework agent 110, the workflow 116, the purpose service agent 114, and the application 122 are active components while the data controller storage 103, the purpose definition 106, the purpose determination setup agent 108, rules 112, and assignments 118, 120 are data storage components. As such, for example, in some embodiments, the data controller storage 103 comprises a set of stored data relating to a data controller. Further, in some embodiments, data storage components may be stored on and retrieved from one or more data stores.

In some embodiments, the application 122 may asynchronously initiate a trigger to the purpose agent 102 through an event mechanism, as will be described in further detail below. Further, in some embodiments, the purpose agent 102 may request additionally information from the application 122 such as, for example, data related to the data controller, data relating to a predecessor, and inputs for rule determination. In some embodiments, an additional user 125 may be included. Said user 125 may operate the application 122, as shown. In some embodiments, the purpose agent 102 may submit one or more data requests to various other components. For example, in some embodiments, the purpose agent 102 may be communicatively coupled to each of the purpose service agent 114, the rules framework agent 110, and the workflow 116. Further, the application 122 may submit a request to the purpose agent 102 via an asynchronous event, as described above.

In some embodiments, at least one of the users 124 or user 125 may be a data subject such that the at least one user's data is managed by the data controller 104. Further, in some embodiments, the data subject may be yet another user which is not shown in FIG. 1. Accordingly, the purpose agent 102 assigns at least one purpose to the data of the data subject to protect the data of the data subject and ensure that the data is only used for the specified purposes. For example, the assigned purpose may restrict access to the data of the data subject such that certain sensitive data is only accessible to certain authorized entities for the specified purposes. As such, the data controller 104 is only able to share data of the data subject if said sharing is described by the assigned purpose. Further, the data controller 104 itself may be restricted such that the data controller 104 can only process the data of the data subject for specific purposes.

In some embodiments, the rule framework agent 110 may provide additional rules associated with an assigned purpose. For example, a rule may specify a set of authorized entities which have access to a set of data or a document. In some embodiments, rules may be provided for determining the purpose based on specific needs of the application 122 and specific content within the set of data or document to which a purpose is being assigned. Further, in some embodiments, the rule framework agent 110 identifies a purpose for a document based on a set of policies defined within the system 100. Further still, embodiments are contemplated in which documents including data sets may be generated during execution such that purposes may be assigned as data is received or generated.

In some embodiments, a plurality of applications may be included within the system 100. For example, the purpose agent 102 may provide purpose-based processing and access to a plurality of applications. Accordingly, in some such embodiments, each application may choose to opt in or out of purpose-based data processing. As such, the applications may opt out of purpose-based processing such that the purpose agent 102 does not disrupt normal operation of the application. Further, since the purpose agent 102 operates asynchronously from the application 122, embodiments are contemplated in which applications do not have to opt out of purpose-based processing. Here, the purpose agent 102 may still be triggered but no purpose will be determined.

In some embodiments, a machine learning algorithm may be used as part of at least one of the components in the system 100. For example, in some embodiments, a machine learning algorithm may be included as part of the purpose agent 102. Accordingly, the machine learning algorithm may be trained to assign a purpose to a set of data. For example, the machine learning algorithm may be trained over time to identify the use of various sets of data and documents. Accordingly, the machine learning algorithm may determine a purpose based on the use. For example, the machine learning algorithm may be trained to identify tax data and assign a tax audit purpose to the tax data. Further still, in some embodiments, the machine learning model may be trained by data mining various web resources relating to processing of personal data to determine what types of data are used by various entities for various purposes.

In some embodiments, various components of the system 100 may include, for example, a processor programmed to perform various operations for carrying out such embodiments. For example, a processor may be included on or associated with the purpose agent 102 for assigning a purpose to a set of data. Further, embodiments are contemplated in which various processing steps may be distributed across multiple components are a plurality of different processors. Further still, in some embodiments, various components of the system 100 may be duplicated. For example, the system 100 may be adapted to a plurality of data controllers 104 such that the purpose-based processing may be provided to a plurality of different data controller entities.

Embodiments are contemplated in which the purpose assignment may be made retroactively on an existing set of data. For example, a data controller 104 may already have a large set of personal data and decide to implement purpose-based processing and data storage. Accordingly, the data controller 104 may provide the data set to the purpose agent 102 which will assign a purpose to the existing data. Alternatively, in some embodiments, purposes may be assigned as new data is created or updated.

Figure 2:
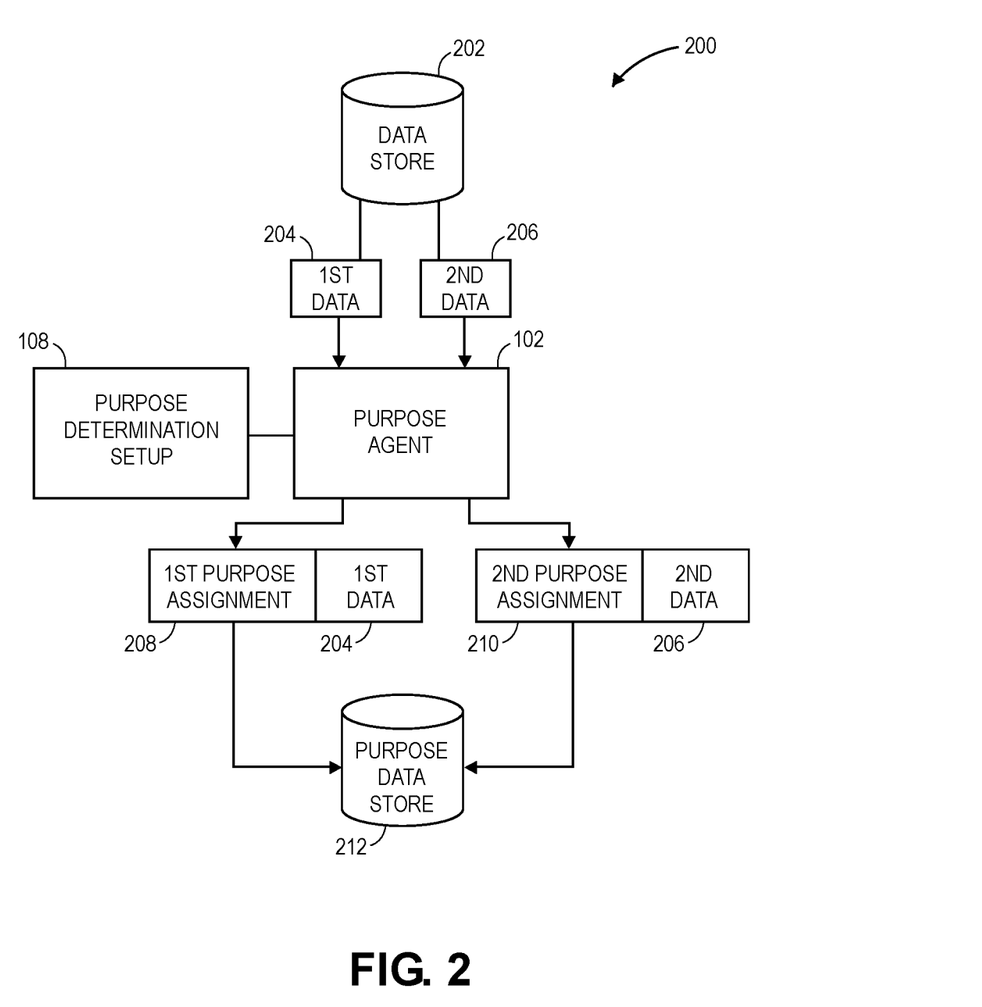
FIG. 2 depicts an exemplary system diagram for assigning purposes to data sets relating to some embodiments.

Turning now to FIG. 2, an exemplary system diagram is depicted relating to some embodiments and is referred to generally by reference numeral 200. The system 200 includes a data store 202 which may provide a first set of data 204 and a second set of data 206. In some embodiments, the purpose agent 102 receives the first set of data 204 and the second set of data 206 from the data store 202, as shown. Alternatively, embodiments are contemplated in which the first set of data 204 and the second set of data 206 are not received from the data store 202 but are provided directly by a user or are newly created. In some embodiments, the purpose agent 102 analyzes the sets of data to determine a purpose for each data set. In some embodiments, the purpose determination setup agent 108 may provide the purpose agent 102 with instructions for assigning a purpose to each respective data set. Accordingly, the purpose agent 102 assigns a first purpose assignment 208 to the first set of data 204 and a second purpose assignment 210 to the second set of data 206 based at least in part on the content of the data and the instructions from the purpose determination setup agent 108.

In some embodiments, the purpose assignments 208 and 210 may be stored in a purpose data store 212. Embodiments are contemplated in which a plurality of purpose data stores may be included. For example, a first purpose data store may be associated with a first data controller while a second purpose data store may be associated with a second data controller. In some embodiments, the data sets 204 and 206 may also be stored in the purpose data store 212. However, in some embodiments, the data sets 204 and 206 are not directly stored in the purpose data store 212 but information identifying the data sets may still be stored along with the purpose assignment such as key information identifying each data set. In some embodiments, the data sets may be stored within a table data structure such that a value indicative of the purpose assignment is stored within a table entry of the respective data set. Alternatively, embodiments are contemplated in which each purpose assignment is stored as metadata for the respective data set. Further, in some embodiments, the purpose assignments 208 and 210 may be stored within the data store 202 from which the data sets 204 and 206 were retrieved. Accordingly, embodiments are contemplated in which the purpose agent 102 is used to enable purpose-based data processing and purpose-based data retrieval to an existing data store. For example, the data within an existing data store may be processed to determine a purpose for at least a portion of the data. Further still, in some embodiments, one or more assigned purposes may be stored as attributes for the respective set of data.

Figure 3:
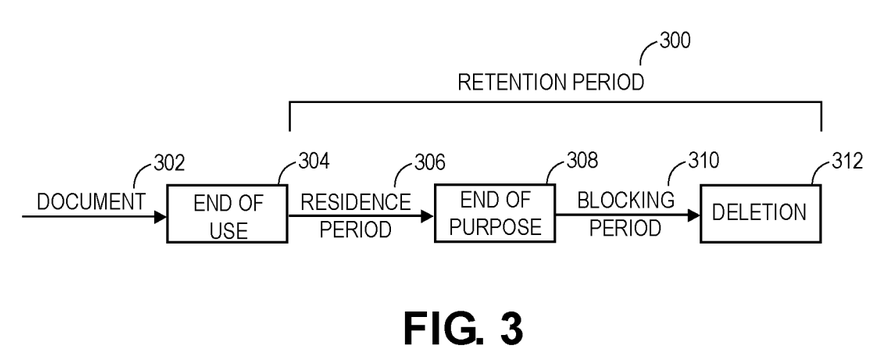
FIG. 3 depicts an exemplary timeline of a retention period relating to some embodiments.

Turning now to FIG. 3, an exemplary timeline defining a retention period 300 for a set of data is depicted relating to some embodiments. In some embodiments, the set of data may comprise a document 302, which in some embodiments may be received before the retention period 300 begins. Alternatively, in some embodiments, a purpose may be assigned to the document 302 as the document is received such that the retention period 300 may begin when the document 302 is received. In some embodiments, the retention period 300 starts with an end of use of a document or set of data, for example, when a document is completed. In some embodiments, the purpose assignment contains the relevant retention periods. In some embodiments, the retention periods do not start immediately for the document. In some embodiments, the document 302 may be any of a financial document, a personal document, a sales document, or another suitable document or file. For example, in some embodiments, the document 302 may be a set of user data including user information such as an email address or other user contact information. In some embodiments, the document 302 may be received and stored in a data store, such as, for example, data store 202. In some embodiments, the document 302 may include one or more sets of data. For example, embodiments are contemplated in which the document 302 comprises both of the first set of data 204 and the second set of data 206, as shown in FIG. 2.

An end of initial use 304 for the document 302 may occur at some time after the document is received. Typically, the document 302 may be deleted at this point, however, if at least one purpose is assigned to the document 302 containing a retention period that requires storage of the document 302 beyond the end of the use 304, the document 302 may persist longer in storage for the duration of the retention period 300. In some embodiments, the retention period 300 begins whenever at least one purpose is assigned to the document 302. Alternatively, in some embodiments, the retention period 300 begins after the end of initial use 304 of the document 302.

A residence period 306 may be included for the document 302 as a first portion of the retention period 300 for the document 302. In some embodiments, during the residence period 306 processing of the document 302 is still allowed until the end of an assigned purpose. An end of purpose 308 occurs after the residence period 306 for a given purpose. However, in some embodiments, the retention period 300 further comprises a second portion which is a blocking period 310 for the document 302, as shown, during which the document 302 is retained until the end of the retention period 300. In some embodiments, display of the document 302 is only available to a set of specially authorized users during the blocking period 310. Further, embodiments are contemplated in which the document 302 can no longer be changed or edited during the blocking period 310 to preserve document integrity and prevent tampering. In some embodiments, a document may be assigned a primary purpose and a complementary purpose associated with the primary purpose. It may be assumed that the residence period and the retention period per each purpose have the same length. Accordingly, blocking of the document may begin when there are valid complementary purposes that have a retention period but may not have a defined residence period. Here, the residence period may comprise a grace period which allows processing only by specially authorized users. As such, an assigned purpose without a retention period is only accessible to said specially authorized users and typical users cannot access the document.

During the retention period 300 of a set of data, the data may only be accessible to a select few entities with specific authorization based on the purposes assigned to the set of data. As such, if an entity attempts to access the data for a subsequent purpose which is not assigned to the data, the access will be denied such that the data is inaccessible for the subsequent purpose. Further, embodiments are contemplated in which various purposes have different retention periods. For example, a first purpose may have a first retention period of six months and a second purpose may have a second retention period of one year. Accordingly, the first retention period may expire before the second retention period such that the data will be accessible only based on the second purpose after the first retention period has expired.

In some embodiments, the blocking period 310 extends until all retention periods for the assigned purposes of the document 302 have expired. Document deletion 312 of the document 302 occurs after the blocking period 310 when all associated retention periods for the document 302 have expired. Further, embodiments are contemplated in which purposes may be included which have indefinite retention periods 300, for example, based on the type of content included in the set of data. For example, a username or other personal data which is not particularly sensitive may be stored indefinitely. In some embodiments, the blocking period 310 may be entered by setting a blocking indicator for the data or for the purpose. For example, a blocking indicator may be included in a set of metadata associated with the personal data of the data subject indicating that the personal data has entered the blocking period 310 and should no longer be altered. In some embodiments, a blocking flag may be set for each purpose. In some embodiments, blocking will be valid only for a complete document and may be set when the residence period of all assigned purposes has ended.

Embodiments are contemplated in which any of the retention period 300, the residence period 306 and the blocking period 310 may depend on additional factors. For example, in some embodiments, the retention period 300 may depend on a factor such as employment of the data subject. Here, for example, the data controller 104 may be the data subject's employer and the retention period 300 may be determined based on the data subject's employment status. Accordingly, the retention period 300 may be set to expire once the data subject's employment has ended or a certain time after employment has ended. For example, in some embodiments, the residence period 306 may end when the data subject's employment ends and the blocking period 310 may occur after employment has ended such that the personal data of the data subject is stored but may not be altered.

In some embodiments, a variety of other types of data are contemplated. For example, personal data of the data subject may include any of bank account information, mailing address, photos and images of the data subject, a professional profile of the data subject, a credit score of the data subject, and biometric data, such as, the voice data, fingerprint data, facial recognition data, and other forms of biometric data. Accordingly, the set of data as described herein may include any of the examples of the personal data described herein, as well as other types of personal data and other data relating to the data subject.

The purpose-based data storage architecture described herein allows personal, legal, and sales data to be stored based on the specific needs and requirements of the data subject as it pertains to specific legal and financial requirements. For example, certain types of data may be stored and accessible to certain specifically authorized entities based on a legal requirement which is present in the geographical region in which the data is to be stored. As one example, purposes may be assigned based at least in part on the General Data Protection Regulation (GDPR) which addresses the processing and transfer of personal data of individuals within the geographical region of the European Economic Area (EEA).

In some embodiments, data within the document may be assigned both a primary purpose, as well as a complementary purpose associated with the primary purpose. For example, in some embodiments, the primary purpose is the original purpose for processing the data while the complementary purpose is a consequence of the primary purpose. Accordingly, a complementary purpose may be included if different retention periods are required for the set of data. Further, embodiments are contemplated in which complementary purposes are included for related sets of data such that the primary purpose and the complementary purpose correspond to at least partially disjunct sets of data.

In some embodiments, a secondary purpose which is distinct from the primary purpose may be assigned to the same set of data or to a portion of the set of data. Here, for example, the set of data may need to be accessed for more than one purpose. In one example, the data subject has provided a set of personal data which includes contact information for the data subject to the data subject's banking entity, which in this example is the data controller 104. Accordingly, a primary purpose may be assigned to the contact information specifying that the contact information may be used for the banking entity to contact the data subject directly. Additionally, a secondary purpose may be assigned to the contact information specifying that the contact information may be used to provide promotional banking offers to the data subject. As such, the secondary purpose may be associated with a separate secondary retention period which may be different than the retention period of the primary purpose. It should be noted that, in some embodiments, any number of purposes may be assigned to a given set of data or document. For example, each of a primary purpose, a secondary purpose, and a tertiary purpose may be assigned to a set of data.

In one example, the purpose agent 102 may be used to assign purposes in order to manage purpose-based access and data storage for a utility company. Accordingly, the utility company may be required to store at least a portion of personal data corresponding to customers of the utility company such as contact information and bank account information. Accordingly, a payment purpose may be assigned to the bank account information such that the bank account information may be processed only to provide payments from the customer, for example, as part of an auto-pay feature of the utility company. Further, the contact information, such as, for example, a phone number of the utility customer may be assigned a purpose such that the phone number may be used for the utility company to contact the customer but may not be used for promotional offers and is not shared with external entities.

In some embodiments, a variety of different purposes are contemplated. In some embodiments, the purposes which may be assigned by the purpose agent 102 may include an internal identification purpose, for example to physically identify employees of a company, a facial recognition purpose to identify data subjects based on biometric data, a product suggestion purpose, for example by using data of the data subject to determine specific relevant products, and a booking/reimbursement purpose, for example to reimburse the data subject if an event or service is cancelled.

In one example, the data controller 104 is an airline company and the data subject is a user who has booked a flight through the airline company. Here, the data subject has provided personal information including their name, contact information, address, and bank account information. Accordingly, the booking/reimbursement purpose is assigned to the personal data such that, if the flight is cancelled, the airline company may access the personal data to provide reimbursement to the data subject. Embodiments are contemplated in which any combination of automatically assigned purposes and user-defined consent-based purposes are included.

In some embodiments, certain purposes may be automatically assigned by default and may be manually adjusted, for example, by the data subject to include user-defined consent-based purposes. For example, contact information may be automatically, assigned an emergency contact purpose by default, but a secondary purpose for promotional offers may be added by the data subject. In some embodiments, the data controller 104 may be able to preconfigure certain default purposes to be automatically assigned to certain types of data. As such, the purpose assignment may be catered to specific preferences and needs of the data controller 104. In some embodiments, purposes may be user-specific to each data subject. For example, a data subject may configure which purposes should be assigned to certain portions of their personal data.

Further still, embodiments are contemplated in which a training purpose may be included. Here, the training purpose may specify that personal data of the data subject may be used for training. For example, the personal data may be used in a simulated training session to train an operator. Further, the personal data may be used to train various machine learning models. Accordingly, the data subjects may be able to specify whether their personal data should be accessible for training the various machine learning models. Embodiments are also contemplated in which additional user-defined purposes may be added. For example, operators or data subjects may be able to specify additional purposes based on their own preferences or to adapt to new processing environments.

Figure 4:
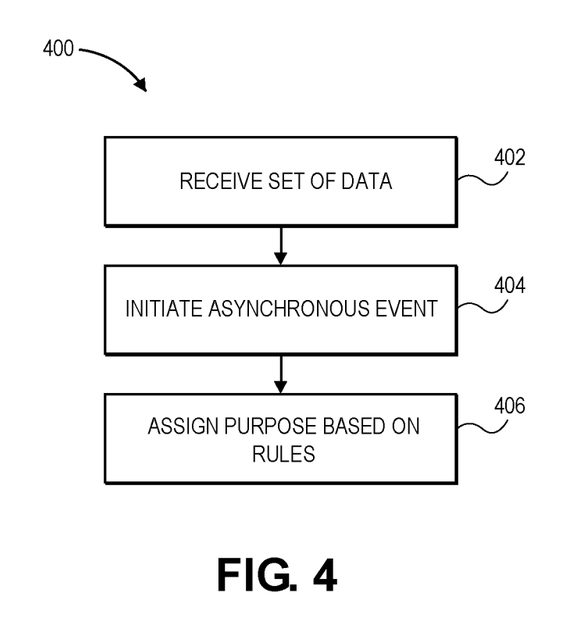
FIG. 4 depicts an exemplary method for providing purpose-based processing and data storage relating to some embodiments.

Turning now to FIG. 4, an exemplary method 400 for providing purpose-based processing and data storage is depicted relating to some embodiments. In some embodiments, the method 400 includes steps of a purpose-controlled lifecycle for a set of personal data. At step 402 a set of data is received. In some embodiments, for example, the set of data may be received on the application 122. In some embodiments, the set of data may be a document or may be an entry within a document or spreadsheet. Further, the set of data may comprise an update or change to a document or data entry. At step 404 an asynchronous triggering event is initiated within the purpose agent 102 in response to receiving the set of data. In some embodiments, the asynchronous triggering event is used to initiate or request the purpose assignment of the purpose agent 102. In some embodiments, using an asynchronous triggering event optimizes processing such that the application 122 does not wait for a reply from the purpose agent 102. Accordingly, in some embodiments, the application 122 initiates an asynchronous event trigger to the purpose agent 102.

At step 406 a purpose is assigned, using the purpose agent, to the set of data based on one or more purpose determination rules. In some embodiments, the purpose determination rules comprise a set of predefined or predetermined rules which may be provided, for example, by the purpose determination setup agent 108 or the rule framework agent 110. In some embodiments, the purpose determination rules comprise information which is used to assign a purpose based on the specific type of content within the set of data. For example, if the set of data comprises financial employment records a tax-based purpose may be assigned to the set of data such that the data is accessible for a tax audit. Further, in some embodiments, the purpose may be assigned based at least in part on specific application details of the application 122. In some embodiments, the purpose may be assigned based on predecessor information for the set of data. For example, the set of data may be an updated or revised version of a document which is already stored and has already been assigned a purpose. Accordingly, the updated data may be assigned the same purpose as its predecessor.

In some embodiments, at least a portion of the steps described herein with respect to the method 400 may be repeated, for example, to assign a subsequent purpose to the same set of data or to another set of data. Accordingly, embodiments are contemplated in which the purpose agent 102 is used to manage purpose-based processing for a large-scale data system. For example, a plurality of documents and data sets may have a respective plurality of processes, such that each document or data set is accessible for its respective purpose.

In some embodiments, to improve transparency, purpose information may be provided to a data subject. In such embodiments, the data subject may be a user who the set of data belongs to or is associated with. For example, a data subject may be notified of the specific purposes for which their personal data is accessible. Further, in some embodiments, the data subject may be able to provide consent for sharing their data or, in some circumstances revoke access to their personal data. For example, a data subject may provide biometric data within a set of data and give consent that the biometric data should only be used for facial recognition and should not be shared or used for any other purpose. Accordingly, a consent-based facial recognition purpose may be assigned based on consent given by the data subject.

In some embodiments, a graphical user interface may be included such that the data subject may review various aspects of the purpose-based access and data storage techniques described herein. For example, the graphical user interface may be generated for display on a user device of a data subject user, such that the data subject can provide consent for data sharing and manage various purposes for their data. In one example, the data subject user may specify one or more specific purposes for which a set of sensitive personal data may be used, for example by providing user input into the graphical user interface. Accordingly, the purpose agent 102 may assign purposes to the data based on these user inputs.

In another example, the data subject may specify that a certain portion of their personal data should be accessible for a product suggestion purpose. Accordingly, the name and address of the data subject may be used by the data controller 104 to provide promotional offers and product suggestions, for example by mailing product offers and sales information to the data subject's address. Further still, in some embodiments, the data subject's purchase history data may be processed in order to personalize the product offers to the data subject.

Figure 5:
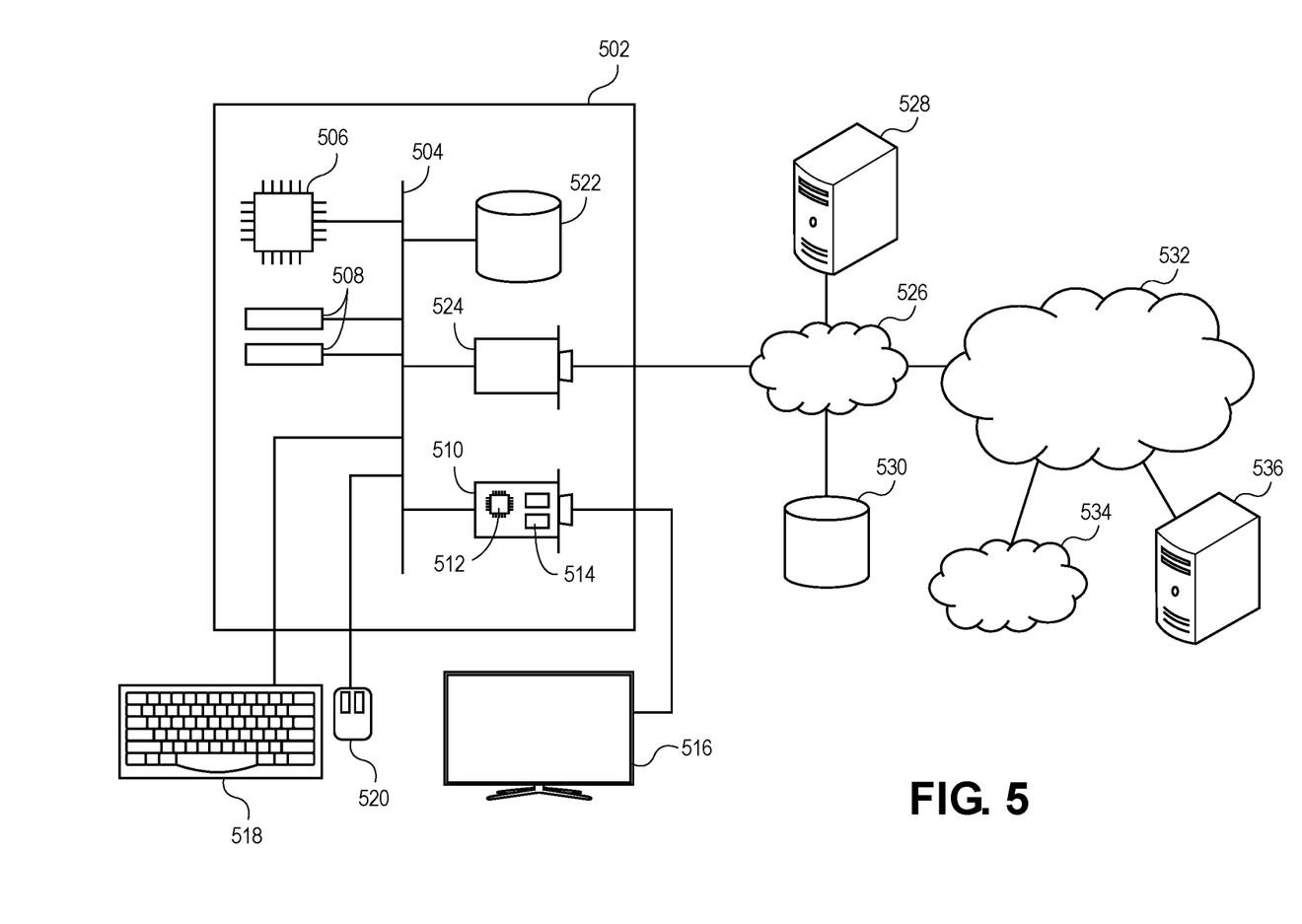
FIG. 5 depicts an exemplary diagram of a hardware platform for carrying out certain embodiments.

Turning now to FIG. 5, an exemplary hardware platform for certain embodiments is depicted. Computer 502 can be a desktop computer, a laptop computer, a server computer, a mobile device such as a smartphone or tablet, or any other form factor of general- or special-purpose computing device. Depicted with computer 502 are several components, for illustrative purposes. In some embodiments, certain components may be arranged differently or absent. Additional components may also be present. Included in computer 502 is system bus 504, whereby other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also on graphics card 510 is GPU memory 514. Connected (directly or indirectly) to graphics card 510 is display 516 for user interaction. In some embodiments no display is present, while in others is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, and may be internally installed in computer 502 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other non-transitory memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the IEEE 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over Internet 532. Local network 526 is in turn connected to Internet 532, which connects many networks such as local network 526, remote network 534 or directly attached computers such as computer 536. In some embodiments, computer 502 can itself be directly connected to Internet 532.

Although the present teachings have been described with reference to the embodiments illustrated in the attached drawing figures, it is noted that equivalents may be employed and substitutions made herein without departing from the scope of the present teachings as recited in the claims.

Having thus described various embodiments, what is claimed as new and desired to be protected by Letters Patent includes the following:

1. One or more non-transitory computer-readable media storing computer-executable instructions that, when executed by a processor, perform a method for providing purpose-based processing within a data system, the method comprising:
   receiving a set of data within an application in communication with a purpose agent configured to receive a request to assign a purpose to received data, the set of data comprising personal data of a data subject;
   responsive to receiving the set of data, sending the set of data from the application to the purpose agent as the request to assign a purpose to received data;
   responsive to receiving the set of data at the purpose agent, initiating an asynchronous trigger event within the purpose agent, wherein the application continues to process additional sets of data without waiting for a reply from the purpose agent;
   assigning, using the purpose agent, a primary purpose to the set of data based on one or more predetermined purpose determination rules;
   in computer-readable storage, storing the primary purpose as associated with the set of data;
   determining a retention period for the set of data based on the assigned primary purpose;
   storing the set of data in a data store;
   restricting access to the set of data based on the assigned primary purpose; and
   after the retention period has expired, deleting the set of data from the data store.

2. The computer-readable media of claim 1, further comprising:
   assigning a complementary purpose to a portion of the set of data based on the one or more predetermined purpose determination rules; and
   determining a complementary retention period for the portion of the set of data based on the complementary purpose.

3. The computer-readable media of claim 2, wherein the portion of the set of data persists after the set of data is deleted based on the complementary retention period.

4. The computer-readable media of claim 3, wherein the complementary purpose is associated with a set of legal parameters for defining access to the portion set of data, and the complementary retention period is based at least in part on the set of legal parameters.

5. The computer-readable media of claim 1, wherein the primary purpose is associated with a set of user-defined parameters for defining access to the set of data.

6. The computer-readable media of claim 1, wherein the primary purpose is associated with a set of legal parameters for defining access to the set of data.

7. The computer-readable media of claim 6, wherein the retention period is based at least in part on the set of legal parameters.

8. A method for providing purpose-based processing within a data system, the method comprising:
receiving a set of data within an application, the set of data comprising personal data of a data subject;
responsive to receiving the set of data, initiating an asynchronous trigger event within a purpose agent;
requesting, by the purpose agent, data relating to a predecessor of the set of data;
assigning, using the purpose agent, based on the predecessor of the set of data, a primary purpose to the set of data based on one or more predetermined purpose determination rules, the primary purpose defining access to the set of data, wherein the predecessor of the set of data comprises an updated or revised version of a document that is already stored and has already been assigned purpose, and a same purpose is assigned to the set of data as to the predecessor;
determining a retention period for the set of data based on the assigned primary purpose;
storing the set of data in a data store;
restricting access to the set of data based on the assigned primary purpose; and
after the retention period has expired, deleting the set of data from the data store.

9. The method of claim 8, wherein the set of data is retrieved from an existing set of personal data on the data store.

10. The method of claim 8, wherein the retention period comprises:
a residence period during which processing of the set of data is available; and
a blocking period during which changes to the set of data are prevented.

11. The method of claim 8, wherein the retention period is based at least in part on a legal requirement associated with the set of data.

12. The method of claim 8, wherein access to the set of data is restricted such that the set of data is accessible for the assigned primary purpose but is inaccessible for a subsequent purpose distinct from the assigned primary purpose.

13. The method of claim 8, wherein the purpose assignment is made retroactively on an existing set of data as part of a purpose implementation.

14. The method of claim 8, further comprising:
assigning, using the purpose agent, a complementary purpose to the set of data based on the one or more predetermined purpose determination rules, the complementary purpose further defining access to the set of data.

15. A method for providing purpose-based processing within a data system, the method comprising:
receiving a set of data within an application in communication with a purpose agent configured to receive a request to assign a purpose to received data, the set of data comprising personal data of a data subject;
responsive to receiving the set of data, sending the set of data from the application to the purpose agent as the request to assign a purpose to received data;
responsive to receiving the set of data at the purpose agent, initiating an asynchronous trigger event within the purpose agent, wherein the application continues to process additional sets of data without waiting for a reply from the purpose agent;
assigning, using the purpose agent, a first purpose to the set of data based on one or more predetermined purpose determination rules, the first purpose defining access to the set of data;
in computer-readable storage, storing the first purpose as associated with the set of data;
assigning, using the purpose agent, a second purpose to the set of data based on the one or more predetermined purpose determination rules, the second purpose further defining access to the set of data;
determining a first retention period for the set of data based on the first purpose;
determining a second retention period for the set of data based on the second purpose;
storing the set of data in a data store;
restricting access to the set of data based on one of the first purpose and the second purpose; and
after both of the first retention period and the second retention period have expired, deleting the set of data from the data store.

16. The method of claim 15, further comprising:
in response to determining that the first retention period has expired and the second retention period has not expired, restricting access to the set of data based on the second purpose such that the set of data is no longer accessible for the first purpose.

17. The method of claim 15, wherein the first purpose is a consent-based purpose such that access to the set of data is restricted based on data subject consent.

18. The method of claim 17, wherein the second purpose is legal-based purpose such that the second retention period is based on a set of legal parameters.

19. The method of claim 15, further comprising:
assigning a complementary purpose to the set of data, the complementary purpose associated with the first purpose; and
determining a complementary retention period for the set of data based on the complementary purpose.

20. The method of claim 19, wherein the complementary purpose is a legal-based purpose and the complementary retention period is based on a set of legal parameters.

* * * * *